(12) United States Patent
Nakanishi (10) Patent No.: US 7,924,215 B2
(45) Date of Patent: Apr. 12, 2011

(54) RADAR APPARATUS AND MOBILE OBJECT

(75) Inventor: Motoi Nakanishi, Nagaokakyo (JP)

(73) Assignee: Murata Manufactruing Co., Ltd., Nagaokakyo-shi, Kyoto-fu (JP)

( * ) Notice: Subject to any disclaimer, the term of this patent is extended or adjusted under 35 U.S.C. 154(b) by 0 days.

(21) Appl. No.: 12/212,119

(22) Filed: Sep. 17, 2008

(65) Prior Publication Data

US 2009/0015462 A1 Jan. 15, 2009

Related U.S. Application Data

(63) Continuation of application No. PCT/JP2007/055068, filed on Mar. 14, 2007.

(30) Foreign Application Priority Data

Mar. 27, 2006 (JP) ................................. 2006-085736
Nov. 2, 2006 (JP) ................................. 2006-298701

(51) Int. Cl.
*G01S 13/93* (2006.01)
*G01S 13/58* (2006.01)

(52) U.S. Cl. .......................... 342/109; 342/107; 342/114

(58) Field of Classification Search .................. 342/107, 342/109, 114
See application file for complete search history.

(56) References Cited

U.S. PATENT DOCUMENTS

| | | | | |
|---|---|---|---|---|
| 3,737,902 A | * | 6/1973 | O'Hagan et al. | 342/41 |
| 5,249,157 A | * | 9/1993 | Taylor | 340/903 |
| 5,570,094 A | * | 10/1996 | Armstrong | 342/107 |
| 6,795,012 B2 | * | 9/2004 | Nakanishi et al. | 342/70 |
| 6,831,595 B2 | * | 12/2004 | Isaji | 342/109 |
| 7,002,452 B2 | * | 2/2006 | Watanabe et al. | 340/436 |
| 2009/0009381 A1 | * | 1/2009 | Inaba | 342/109 |

FOREIGN PATENT DOCUMENTS

| | | |
|---|---|---|
| JP | 47-30930 | 9/1972 |
| JP | 5-240952 | 9/1993 |
| JP | 9-21869 | 1/1997 |
| JP | 10-143245 | 5/1998 |
| JP | 10-300493 | 11/1998 |
| JP | 11-287857 | 10/1999 |

(Continued)

OTHER PUBLICATIONS

PCT/JP2007/055068 Written Opinion dated Apr. 4, 2007.

(Continued)

*Primary Examiner* — Ian J Lobo
(74) *Attorney, Agent, or Firm* — Dickstein Shapiro LLP (57) ABSTRACT

A signal processing circuit detects, at a plurality of different timing points, a first and a second distance of an oncoming vehicle approaching a vehicle including the radar apparatus and detects a first and a second component of a relative velocity of the vehicle in the radar-apparatus direction. A distance of closest approach of the oncoming vehicle to the vehicle appears when the vehicle and the oncoming vehicle pass each other side by side. The signal processing circuit computes the distance of closest approach on the basis of a formula indicating that a relative velocity given by the first distance, the distance of closest approach, and the first component of a relative velocity in the radar-apparatus direction is equal to a relative velocity given by the second distance, the distance of closest approach, and the second component of a relative velocity in the radar-apparatus direction.

11 Claims, 5 Drawing Sheets

FOREIGN PATENT DOCUMENTS

| | | |
|---|---|---|
| JP | 2001-153946 | 6/2001 |
| JP | 2001-330664 | 11/2001 |
| JP | 2002-228749 | 8/2002 |
| JP | 2003-207559 | 7/2003 |
| JP | 2004-101347 | 4/2004 |
| JP | 2004-226158 | 8/2004 |

OTHER PUBLICATIONS

PCT/JP2007/055068 International Search Report dated Apr. 4, 2007.

* cited by examiner

RADAR APPARATUS AND MOBILE OBJECT

CROSS REFERENCE TO RELATED APPLICATIONS

The present application is a continuation of International Application No. PCT/JP2007/055068, filed Mar. 14, 2007, which claims priority to Japanese Patent Application No. JP2006-085736, filed Mar. 27, 2006, and Japanese Patent Application No. JP2006-298701, filed Nov. 2, 2006, the entire contents of each of these applications being incorporated herein by reference in their entirety.

FIELD OF THE INVENTION

The present invention relates to a radar apparatus for detecting an object using electromagnetic waves and a mobile object including the radar apparatus.

BACKGROUND OF THE INVENTION

As described in Patent Document 1, some existing search and tracking support apparatuses estimate a two-dimensional moving velocity of a detection object, which is a tracking target, using image information obtained from a radar apparatus, and detect a time when the tracking target detection object is at its point of closest approach and the position of the object at that time from the two-dimensional moving velocity of the tracking target detection object and the two-dimensional moving velocity of the apparatus itself.

Such apparatuses can compute the distance of closest approach of the detection object using the two-dimensional moving velocity of the detection object and the two-dimensional moving velocity thereof (the distance of closest approach="0" in these existing apparatuses).

In addition, existing radar apparatuses for a motor vehicle scan a beam in an azimuth direction and consider the azimuth direction in which the intensity of reflection from the target is maximized as the azimuth direction of the target. However, in this method, even when the target is located in the upper front direction, and therefore, the target and the vehicle can pass each other, the radar apparatus determines that the target is an obstacle to the vehicle. Thus, when going under an overpass or a traffic sign, the vehicle may receive an incorrect warning or an incorrect brake signal.

On the other hand, Patent Documents 2 to 6 describe radar apparatuses that can determine whether a motor vehicle and a target can pass each other by acquiring the height information about the target.

Patent Document 2 describes a method for determining the height of a target that is stationary by determining whether the effect of multipath appears.

Patent Document 3 describes a configuration in which a beam is scanned in the horizontal direction by moving an antenna mechanically, and the beam is scanned in the vertical direction by using phased array antenna.

Patent Document 4 describes a configuration in which a traveling wave antenna that changes the irradiation direction in accordance with the frequency is used, and the elevation angle at which an object is located is determined using the intensity of a pulse while changing the frequency first. Subsequently, FM-CW modulation is performed mainly for the frequency corresponding to the elevation angle. By switching an electronic switch and performing horizontal scanning, detection can be performed effectively even for a sloping road.

Patent Document 5 describes a configuration in which a traveling wave antenna is employed, and a beam is scanned in a vertical direction using frequency switching or using a phase shifter.

Patent Document 6 describes a configuration in which detection is made by performing electronic scanning in a horizontal direction and performing scanning in a vertical direction using a phase mono-pulse method.

[Patent Document 1] Japanese Unexamined Patent Application Publication No. 2001-330664

[Patent Document 2] Japanese Unexamined Patent Application Publication No. 2001-153946

[Patent Document 3] Japanese Unexamined Patent Application Publication No. 2003-207559

[Patent Document 4] Japanese Unexamined Patent Application Publication No. 2004-101347

[Patent Document 5] Japanese Unexamined Patent Application Publication No. 2004-226158

[Patent Document 6] Japanese Unexamined Patent Application Publication No. 11-287857

The apparatus described in Patent Document 1 can detect in which azimuth direction a detection object is located and in which direction the object is moving with respect to the apparatus, thus highly accurately measuring the distance to the object. However, it is difficult to detect the direction (the azimuth direction) highly accurately. Therefore, the accuracy of azimuth direction detection is decreased. As described above, since the two-dimensional moving velocity is computed using the computed low-accuracy azimuth direction, the estimated computed distance of closest approach includes an error to some extent. If, as described in Patent Document 1, tracking is performed using an image output from a radar apparatus, such an error is acceptable. However, for a radar apparatus mounted in a motor vehicle that detects another vehicle coming from the front direction, such an error is not acceptable in order to prevent collision.

In addition, in order to highly accurately compute the distance of closest approach, the apparatus described in Patent Document 1 needs a large number of sampling points, and therefore, the computing time of the distance of closest approach is increased. However, for a radar apparatus mounted in a motor vehicle, the relative velocity between the vehicle and the oncoming vehicle is high. Accordingly, in this case, the detection and the subsequent collision avoidance operation are performed over a short distance compared with the case of, for example, a boat. Consequently, the distance of closest approach needs to be computed in a short time.

On the other hand, in Patent Document 2, the height is obtained using a distance at which the effect of multipath appears. However, in practice, it is difficult to detect the height of a target in a range in which the reception level is very small, since factors other than the multipath that varies the detection output of the radar apparatus, such as vibration of the traveling vehicle, are present.

In addition, in Patent Documents 3 to 6, the height of a target is obtained by scanning a beam not only in a horizontal direction (an azimuth direction) but also in a vertical direction (an elevation angle direction). Accordingly, the beam scanning operation takes time, and the processing system becomes complicated. Thus, the entire apparatus disadvantageously becomes large-scaled.

SUMMARY OF THE INVENTION

Accordingly, the present invention provides a radar apparatus capable of computing the distance of closest approach highly accurately at high speed and a mobile object that includes the radar apparatus and that can avoid collision accurately.

The present invention further provides a radar apparatus and a mobile object capable of avoiding collision highly accurately by obtaining a three-dimensional relative positional relationship between an object and the radar apparatus without scanning in the elevation angle direction.

The present invention relates to a radar apparatus including transmitting and receiving means for transmitting a transmission signal, receiving a reflection signal of the transmission signal, and outputting a detection signal, and object detecting means for detecting a distance of an object from the radar apparatus and a relative velocity of the object on the basis of the detection signal. According to the present invention, the object detecting means of the radar apparatus computes a distance of closest approach of the object on the basis of a change in the distance of the object from the radar apparatus and a change in the relative velocity of the object acquired from the detection signal.

In such a configuration, the transmitting and receiving means transmits a transmission signal of a predetermined signal format and receives reflected waves from an object located inside a detection area and approaching the radar apparatus at a constant velocity. The transmitting and receiving means then generates a detection signal on the basis of the reflection signal and outputs the detection signal to the object detecting means. The object detecting means computes the distances and components of the relative velocities in the radar-apparatus direction at a plurality of timing points on the basis of the acquired detection signal. Subsequently, the object detecting means computes a distance of closest approach of the detection object to the radar apparatus on the basis of time variations in the distance and component of the relative velocity in the radar-apparatus direction.

Figure 5:
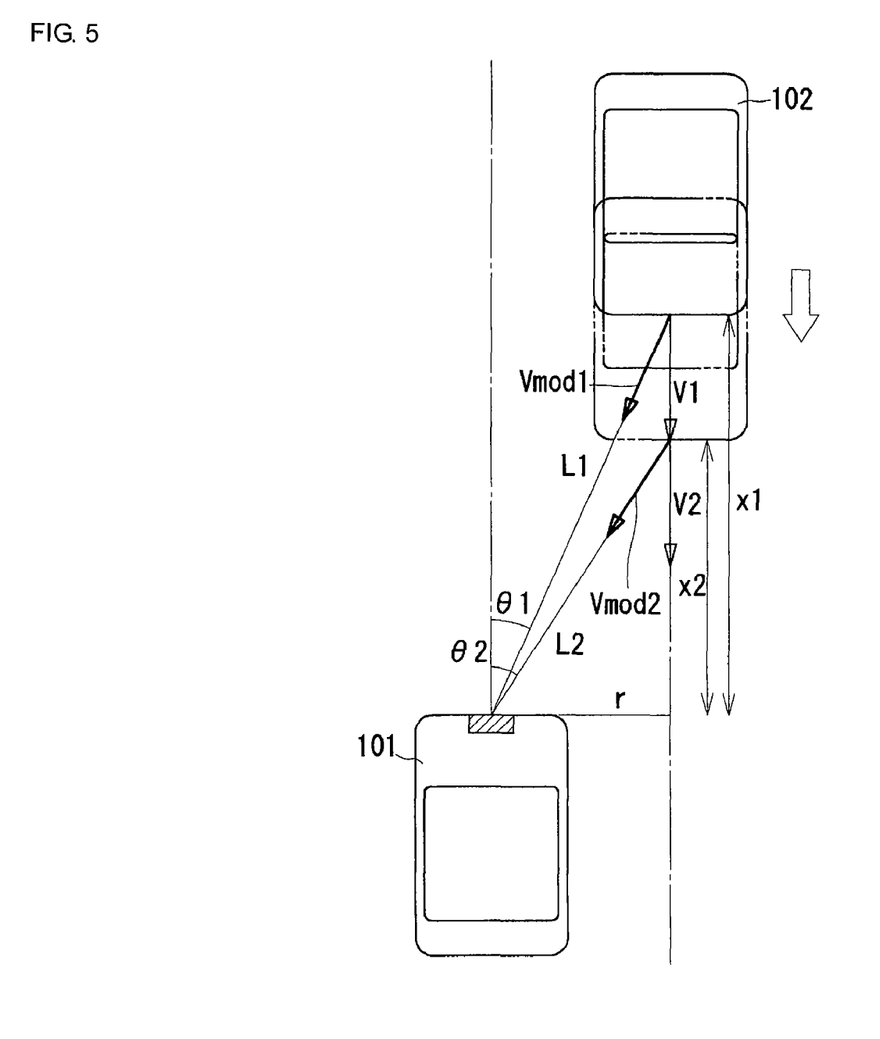
FIG. 5 is a diagram illustrating a method for computing a distance r of closest approach.

More specifically, the distance of closest approach r is computed as follows. FIG. 5 is a diagram illustrating a method for computing the distance r of closest approach. A reference numeral 101 denotes a vehicle including the radar apparatus. A reference numeral 102 denotes an oncoming vehicle to be detected, which is approaching the vehicle 101 at a constant velocity.

L1 denotes a distance detected at a first timing point, Vmod1 denotes a component of the relative velocity in the radar-apparatus direction at that timing point. L2 denotes a distance detected at a second timing point close to the first timing point, and Vmod2 denotes a component of the relative velocity in the radar-apparatus direction at that timing point.

In addition, V1 denotes the relative velocity (the relative velocity in the traveling direction) of the oncoming vehicle 102 at the first timing point, x1 denotes the distance in the traveling direction, and θ1 denotes the azimuth angle. Then, equation (1) is obtained:

$$V\mathrm{mod}1 = V1 \cdot \cos\theta 1 = V1 \cdot \frac{x1}{L1} \quad (1)$$

Similarly, V2 denotes the relative velocity (the relative velocity in the traveling direction) of the oncoming vehicle 102 at the second timing point, and θ2 denotes the azimuth angle at that timing point. Then, equation (2) is obtained:

$$V\mathrm{mod}2 = V2 \cdot \cos\theta 2 = V2 \cdot \frac{x2}{L2} \quad (2)$$

Here, as described above, since the relative velocity is constant, the relative velocities obtained at the two timing points that are temporally very close to each other are the same (V1=V2). Using equations (1) and (2), the following equation is obtained:

$$\frac{V\mathrm{mod}1 \cdot L1}{x1} = \frac{V\mathrm{mod}2 \cdot L2}{x2} \quad (3)$$

By using the Pythagorean theorem, the following equations are obtained at each of the timing points:

$$L1^2 = x1^2 + r^2 \quad (4A)$$

$$L2^2 = x2^2 + r^2 \quad (4B)$$

By using equations (3), (4A) and (4B), the following equation can be obtained:

$$\frac{V\mathrm{mod}1^2 \cdot L1^2}{L1^2 - r^2} = \frac{V\mathrm{mod}2^2 \cdot L2^2}{L2^2 - r^2} \quad (5)$$

Equation (5) can be rewritten with respect to the distance r of closest approach as follows:

$$r^2 = \frac{L1^2 \cdot L2^2 \cdot (V\mathrm{mod}1^2 - V\mathrm{mod}2^2)}{V\mathrm{mod}1^2 \cdot L1^2 - V\mathrm{mod}2^2 \cdot L2^2} \quad (6)$$

$$r = L1 \cdot L2 \cdot \sqrt{\frac{(V\mathrm{mod}1^2 - V\mathrm{mod}2^2)}{V\mathrm{mod}1^2 \cdot L1^2 - V\mathrm{mod}2^2 \cdot L2^2}} \quad (7)$$

This indicates that a distance of closest approach can be computed from only the distance and a component of the relative velocity of the detection object in the radar-apparatus direction. In addition, by detecting the distance and the component of the relative velocity of the detection object in the radar-apparatus direction at least two timing points, a distance of closest approach can be computed.

In addition, according to the present invention, the transmitting and receiving means of the radar apparatus can generate a beat signal obtained from the transmission signal and the reflection signal as the detection signal, and the object detecting means can compute the distance and the relative velocity of the object using a frequency of the beat signal.

In such a configuration, the transmitting and receiving means generates a beat signal by mixing the transmission signal and the reception signal. For a known radar apparatus using an FMCW method, the frequency of the beat signal is obtained by adding a frequency that is proportional to the distance to a Doppler frequency or subtracting a frequency that is proportional to the distance from a Doppler frequency. By applying the method for computing the distance and the relative velocity on the basis of the beat signal frequency, the object detecting means can compute the distance and the component of the relative velocity of the detection object in the radar-apparatus direction.

In addition, according to the present invention, the object detecting means of the radar apparatus can compute the relative velocity (a radar-apparatus-direction component of the relative velocity) on the basis of time variations in a plurality of detected distances.

In this configuration, the relative velocity can be computed using a change in a distance from the radar apparatus to the object without using the above-described Doppler shift frequency. Here, by using a condition that the detection object is approaching at a constant velocity, the object detecting means detects the relative velocity using the plurality of detected distances.

In addition, according to the present invention, when a moving velocity of a mobile object including the radar apparatus is higher than or equal to a predetermined threshold value, the object detecting means of the radar apparatus can compute an azimuth angle at a time of measuring a distance on the basis of the computed distance and the computed distance of closest approach.

In this configuration, if the velocity of the radar apparatus (the mobile object including the radar apparatus) is higher than or equal to a predetermined threshold value, the traveling direction of the radar apparatus (the mobile object including the radar apparatus) can be considered to be parallel to the traveling direction of the detection object. Accordingly, the direction in which the distance was detected at each of the timing points is perpendicular to the direction of the distance of closest approach computed using the above-described method. By using this condition, the object detecting means can compute the traveling direction of the radar apparatus and an angle between the radar apparatus and the object (an object angle $\phi$) at each of the distance detection timing points using the detected distance and the computed distance of closest approach.

According to the present invention, the radar apparatus can further include azimuth angle detecting means for detecting an azimuth angle ($\theta$) of the object by scanning an optical axis of the transmission signal and the reflection signal, for example, in the azimuth direction or without a scanning operation, as in monopulse radars, and optical axis correcting means for correcting deviation of the optical axis with respect to the azimuth angle ($\theta$) detected by the azimuth angle detecting means on the basis of the azimuth angle ($\theta$) and the object angle ($\phi$) when the object and the mobile object are considered to be located in the same horizontal plane.

In this configuration, in addition to the above-described method for computing an azimuth angle, the radar apparatus simultaneously employs a method for detecting an azimuth angle from the signal intensity by mechanically or electrically scanning a reception beam. Here, when an azimuth angle is detected by scanning a beam, the result includes a detection error of the azimuth angle due to deviation of the optical axis. However, in the above-described computing method, since an azimuth angle is computed using the distance and the relative velocity, an error due to deviation of the optical axis does not occur. Accordingly, by comparing the two azimuth angles obtained at the same timing point, an amount of correction for correcting the azimuth angle including an error due to deviation of the optical axis can be computed.

In addition, according to the present invention, the radar apparatus can further include means for computing an azimuth angle ($\theta$) of the object and object height computing means for computing a height (h) of the object on the basis of the azimuth angle ($\theta$) computed by the means, the object angle ($\phi$), the distance (R), and the distance (r) of closest approach.

Figure 6:
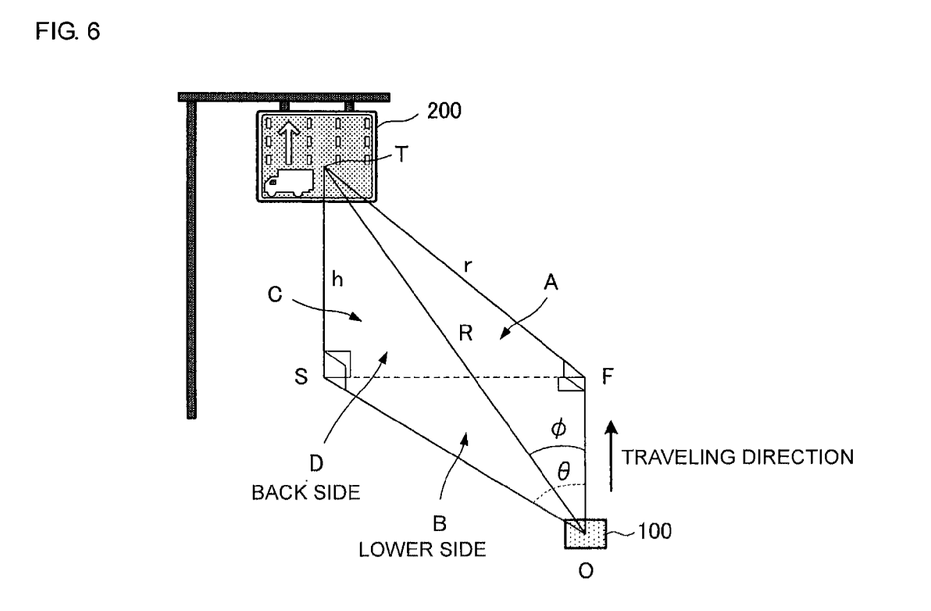
FIG. 6 is a diagram illustrating a method for computing a distance R to an object, the distance r of closest approach of the object, and a height h of the object.

More specifically, the height h of the object is computed as follows. FIG. 6 is a diagram illustrating a method for computing the height h of the object. In this example, the traffic sign serves as an object 200. The position of the radar apparatus 100 is represented by "O". The position of the object 200 is represented by "T". The point at which a position T of the object is projected onto a horizontal plane is represented by "S". A position of the radar apparatus when the radar apparatus 100 and the object are at their distance of closest approach is represented by "F".

The positional relationship between the radar apparatus and the object is described with reference to a tetrahedron formed from four right-angled triangles A, B, C, and D. All the side lengths of each of the right-angled triangles A, B, C, and D can be derived from a distance R from the radar apparatus to the object, a distance r of closest approach, and an azimuth angle $\theta$. Here, the right-angled triangle A has vertexes O, F, and T. The right-angled triangle B has vertexes O, F, and S. The right-angled triangle C has vertexes F, S, and T. The right-angled triangle D has vertexes O, S, and T.

First, since the distance r of closest approach and the distance R of the object from the radar apparatus are known, the distance of the remaining side of the right-angled triangle A (the length of a line O-F) can be given by the following expression using the Pythagorean theorem:

$$\sqrt{(R^2-r^2)} \qquad (8)$$

Since the azimuth angle $\theta$ and the length of the line O-F are obtained, the distance of the hypotenuse of the right-angled triangle B (the length of a line O-S) is:

$$1/\cos\theta\sqrt{(R^2-r^2)} \qquad (9)$$

In addition, the distance of the other side (the length of a line F-S) corresponding the distance in the lateral direction is:

$$\tan\theta\sqrt{(R^2-r^2)} \qquad (10)$$

Since the distance R of the hypotenuse of the right-angled triangle C and the distance of the other side (the length of a line O-S) are obtained, the distance of the remaining side of the right-angled triangle C (the height h) (the length of a line S-T) can be obtained using the Pythagorean theorem as follows:

$$(1/\cos\theta)\sqrt{(r^2-R^2\sin^2\theta)} \qquad (11)$$

In this way, the height h of the object can be computed without scanning a beam in the elevation angle direction.

In addition, according to the present invention, the radar apparatus can further include collision determining means for determining whether risk of collision with the detection object exists on the basis of the distance of closest approach.

In this configuration, after the distance r of closest approach is computed, the collision detecting means determines whether, for example, (A) the distance is such a distance that collision occurs, (B) the distance is such a distance that the object passes very close to the radar apparatus and the risk of collision is high, or (C) the distance is a predetermined distance by which the object is remote from the radar apparatus and the risk of collision is low.

In addition, according to the present invention, a mobile object includes the above-described radar apparatus and collision avoiding means for performing a collision avoiding operation on the basis of collision estimating information obtained by the collision detecting means.

In this configuration, when the mobile object can acquire collision estimating information from the radar apparatus, the mobile object performs a collision avoidance operation using the collision avoiding means.

According to the present invention, since the distance to a detection object and the relative velocity can be accurately detected by the radar apparatus, a distance of closest approach can be computed using only a change in the distance to a detection object and a change amount of a component of the relative velocity in the radar-apparatus direction. Accordingly, an accurate distance of closest approach of the detection object to the radar apparatus can be obtained at high speed.

In addition, according to the present invention, by using a Doppler frequency acquired from a beat signal, the component of the relative velocity in the radar-apparatus direction can be acquired more accurately.

Furthermore, according to the present invention, since the component of the relative velocity in the radar-apparatus direction can be acquired from the detected distances without using the Doppler frequency, even a radar apparatus that measures a distance using a widely used method can acquire a distance of closest approach.

Still furthermore, according to the present invention, when moving at high speed, the radar apparatus (a mobile object including the radar apparatus) can acquire the azimuth angle of the detection object without scanning a reception beam in the horizontal direction.

Still furthermore, according to the present invention, since the azimuth angle can be acquired without scanning an optical-axis beam of transmission and reception signals, optical axis correction for the azimuth angle obtained by scanning the optical axis can be easily performed.

Still furthermore, according to the present invention, since the elevation angle (the height) can be acquired without scanning the optical-axis beam of transmission and reception signals in the elevation angle direction, the need for the time for scanning a beam in the elevation angle direction is eliminated. Therefore, the processing system is not complicated, and the scale of the apparatus is not increased. Thus, compact, light-weight, and low-cost radar apparatus and mobile object can be achieved.

Still furthermore, according to the present invention, since the possibility of collision is determined on the basis of a distance of closest approach, the result of determination in terms of collision can be provided to an operator of the mobile object or a collision avoidance control system of the mobile object.

Yet still furthermore, by providing collision avoiding means to the mobile object, a collision avoidance operation can be easily and accurately performed.

REFERENCE NUMERALS 1 signal processing circuit
2 VCO
3 branch circuit
4 transmission antenna
5 reception antenna
6 LNA
7 mixer
8 IF amplifier
100 radar apparatus
101 vehicle
102 oncoming vehicle
103 different vehicle
110 drive control unit
200 object (traffic sign)
301 stationary side-strip object group
302 stationary median-strip object group
θ azimuth angle
φ object angle

DETAILED DESCRIPTION OF THE INVENTION

First Embodiment

A radar apparatus according to a first embodiment of the present invention is described with reference to the accompanying drawings. In this embodiment, a radar apparatus that employs an FMCW method using a transmission signal frequency-modulated in a triangular waveform is described as an example.

Figure 1A:
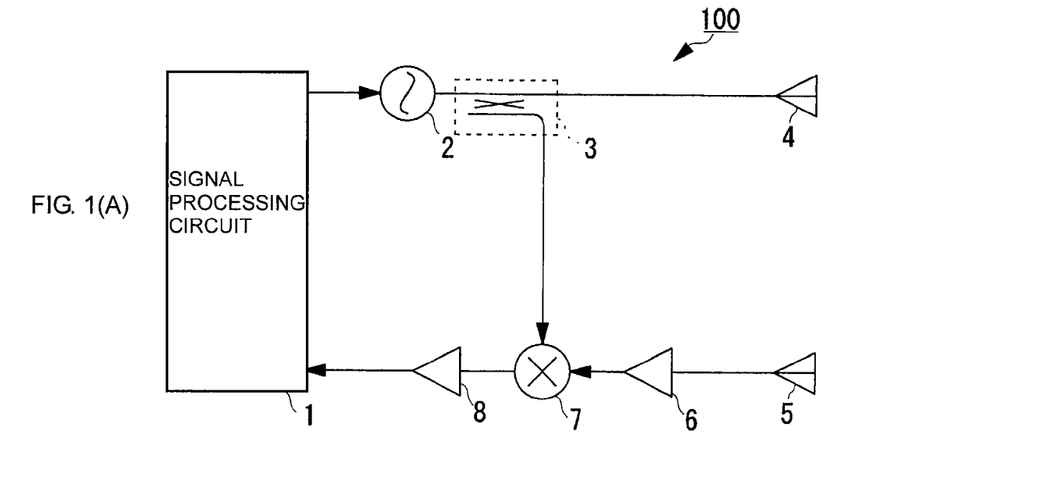
FIG. 1(A) illustrates a block diagram of a major configuration of a radar apparatus according to a first embodiment.
Figure 1B:
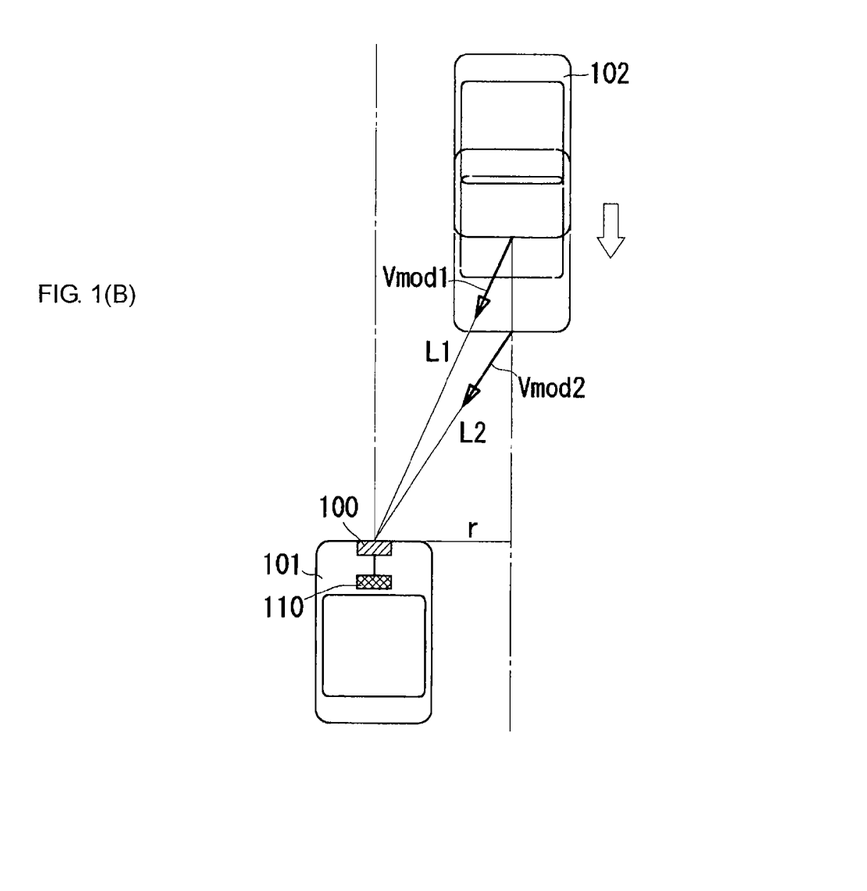
FIG. 1(B) is a diagram illustrating a concept of a method for computing a distance of closest approach of an oncoming vehicle 102 performed by a vehicle 101 including a radar apparatus 100.

FIG. 1(A) is a block diagram of a main configuration of the radar apparatus according to the first embodiment. FIG. 1(B) illustrates a concept of a method for computing a distance of closest approach of an oncoming vehicle 102 to a vehicle 101 including a radar apparatus 100 mounted therein. Note that, in FIG. 1(B), the vehicle 101 is stationary. However, FIG. 1(B) illustrates a simplified situation for ease of description. In this example, the oncoming vehicle 102 is a detection object, and the vehicle 101 and the oncoming vehicle 102 are located in the same horizontal plane (i.e., the height of the oncoming vehicle 102 relative to the vehicle 101 is 0). Even when the vehicle 101 is moving in the front direction, that is, in a direction parallel to the oncoming vehicle 102, at a constant velocity, the following method can be applied. In addition, even when the vehicle 101 and the oncoming vehicle 102 are moving in opposite directions at a constant velocity, the following method can be applied.

According to the present embodiment, the radar apparatus 100 includes a signal processing circuit 1, a VCO 2, a branch circuit 3, a transmission antenna 4, a reception antenna 5, an LNA 6, a mixer 7, and an IF amplifier 8. The radar apparatus 100 is disposed at a front center of the vehicle 101, which is an automobile.

The signal processing circuit 1 generates a control voltage signal used for frequency modulation of a transmission signal and provides the generated signal to the VCO 2. In addition, the signal processing circuit 1 computes a component Vmod of the relative velocity of an object in a radar apparatus direction (hereinafter referred to as a "radar-apparatus-direction relative velocity") and a distance L (a horizontal distance) to the object on the basis of an IF beat signal of an input reception signal using a method described below. The signal processing circuit 1 further computes a distance r of closest approach of the detection object.

The VCO 2 generates a triangular-wave-modulation transmission signal having a frequency that varies in a triangular waveform over time on the basis of a control voltage signal. At that time, the modulation cycle of the transmission signal is determined in accordance with the cycle of the control voltage signal.

The branch circuit 3 provides the transmission signal output from the VCO 2 to the transmission antenna 4, and provides part of the transmission signal to the mixer 7 in the form of a local signal.

The transmission antenna 4 is formed from, for example, a microstrip antenna. The transmission antenna 4 is disposed so that the front direction of the antenna is coincident with the front direction of the vehicle 101 including the radar apparatus 100. The transmission antenna 4 transmits transmission waves to the entire desired detection area so that the front direction is the center of the radiation directivity pattern of the transmission waves.

The reception antenna 5 receives reflected waves reflected off the object located in the detection range of the transmission waves transmitted to the range. The reception antenna 5 has a structure that can receive the reflected waves from all the directions in the detection range. Like the transmission antenna 4, the reception antenna 5 is formed from, for example, a microstrip antenna. In addition, the reception antenna 5 converts the received reflected waves to an electrical signal and outputs the signal as a detection signal.

The LNA 6 amplifies the detection signal output from the reception antenna 5 and outputs the detection signal to the mixer 7. The mixer 7 mixes the reception signal output from the LNA 6 and the local signal output from the branch circuit 3 so as to generate an IF beat signal. The IF amplifier 8 amplifies the IF beat signal and outputs the IF beat signal to the signal processing circuit 1.

The signal processing circuit 1 computes the distance L and the radar-apparatus-direction relative velocity Vmod of the detection object from a known FMCW method using at least one cycle of the acquired IF beat signal. The signal processing circuit 1 performs the computation of the distance L and the radar-apparatus-direction relative velocity Vmod at predetermined timing points. For example, the signal processing circuit 1 performs the computation each time the IF beat signal for one cycle is acquired, and stores the computation results in a memory (not shown). At that time, the distance L, the radar-apparatus-direction relative velocity Vmod, and the acquired time are associated with each other and are stored.

The signal processing circuit 1 refers to the acquired timing points. At the predetermined time intervals, the signal processing circuit 1 computes a distance r of closest approach using computed distances L1 and L2 and radar-apparatus-direction relative velocities Vmod1 and Vmod2 and using the above-described equation (7).

In this way, by employing the structure according to the present embodiment, the distance of closest approach of the detection object can be easily and rapidly computed using only the distance and the relative velocity without computing the azimuth angle. In addition, by using a Doppler frequency as described in the FMCW method according to the present embodiment, the accurate relative velocity can be computed as well as a distance. Accordingly, the distance of closest approach can be accurately computed.

Figure 2:
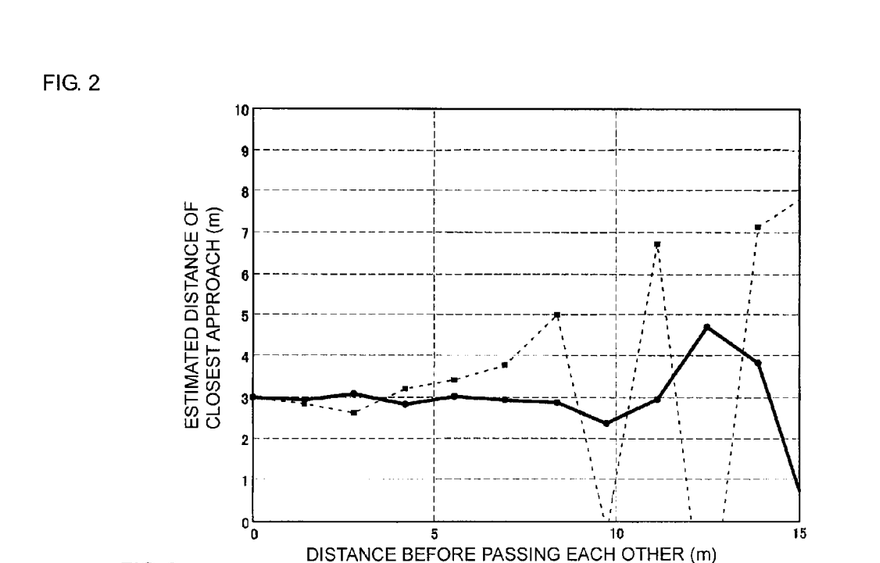
FIG. 2 illustrates the computation result of a distance of closest approach output from the radar apparatus according to the first embodiment and the computation result of a distance of closest approach obtained by using an existing method based on a two-dimensional velocity.

FIG. 2 illustrates the computation result of the distance of closest approach performed by the radar apparatus according to the present embodiment and the computation result of the distance of closest approach performed by the existing radar apparatus using the two-dimensional velocity. The abscissa represents a distance between the vehicle 101 and the oncoming vehicle 102 in the moving direction, while the ordinate represents the computed distance of closest approach at each point. In the present embodiment, the solid line indicates the values for the present embodiment. The broken line indicates the values in the case where it is considered that a detection object passes through an extension line of a line between two measurement points.

As shown in FIG. 2, the existing apparatus can compute the distance of closest approach without variations only up to a distance of about 5 to 6 m. However, by using the radar apparatus according to the present embodiment, the distance of closest approach can be highly accurately computed up to a distance of about 10 to 11 m.

The distance of closest approach obtained in this manner can be used as follows.

The signal processing circuit 1 computes a distance x to the oncoming vehicle 102, which is a detection object, in the moving direction and a relative velocity V of the oncoming vehicle 102 in the moving direction using the computed distance r of closest approach, distance L, and radar-apparatus-direction relative velocity Vmod. Thereafter, the signal processing circuit 1 computes the possibility of collision and the time before the collision or the closest approach (the closest approach time).

The signal processing circuit 1 refers to the obtained closest approach time and acquires a distance r of closest approach of the object having a closest approach time within a predetermined threshold value. While taking into account the width of the vehicle, the signal processing circuit 1 outputs collision avoidance data in accordance with the distance of closest approach.

Data of a distance r of closest approach and the collision avoidance data are associated with each other and prestored. For example, if the distance r of closest approach is within 1 m, collision information is provided to a drive control unit 110 of the vehicle 101. Upon receipt of the collision information, the drive control unit 110 performs automatic collision avoidance control, such as automatic brake control and automatic avoidance steering control. Alternatively, the drive control unit 110 performs hazard prevention assistance control, such as setting a free play of a brake pedal to zero, starting an anti-skid function in order to recover abrupt steering. In addition, if the distance r of closest approach is within 2 m, a warning beep is generated. If the distance r of closest approach is within 3 m, a warning message is displayed. These threshold values can be set in accordance with a desired specification.

Through such processing and control, the risk of collision can be accurately informed to a driver. In addition, if a collision is likely to occur, collision avoidance control can be reliably performed.

After the velocity of the radar apparatus 100 exceeds a certain velocity, the radar apparatus 100 considers the moving direction of the vehicle including the radar apparatus 100 to be parallel to the moving direction of an oncoming vehicle. That is, when the vehicle is moving on a straight road, for example, at a velocity of about 50 to 60 km/h, the vehicle 101 is considered to be moving in a direction parallel to that of the oncoming vehicle 102.

Figure 3:
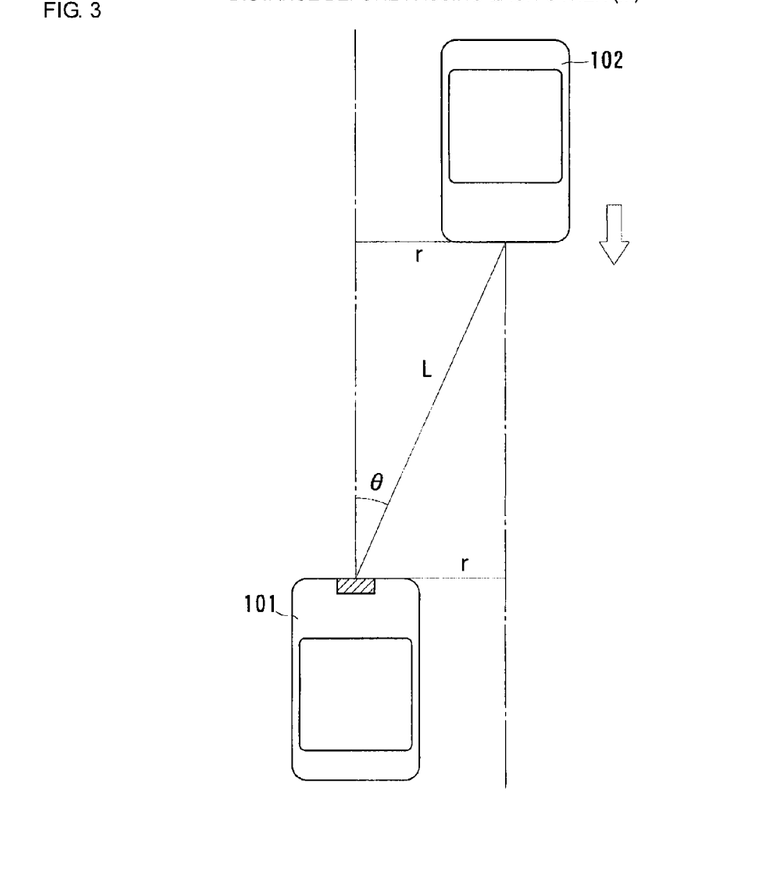
FIG. 3 is a diagram illustrating a principal of computation of an azimuth angle.

Accordingly, when the moving velocity of the vehicle 101 is greater than or equal to a threshold value, the signal processing circuit 1 computes an azimuth angle θ using the computed distance r of closest approach and the computed distance L (the horizontal distance) on the basis of a principal illustrated in FIG. 3. FIG. 3 is a diagram illustrating the principal of computation of the azimuth angle. The azimuth angle θ can be obtained using the following equation:

$$\theta = \sin^{-1}(r/L) \qquad (12)$$

In this way, by using the configuration according to the present embodiment, the azimuth angle θ can be easily computed without scanning a reception beam.

While the present embodiment has been described with reference to a mobile object in the form of an automobile, the present embodiment can be applied to a different mobile object, such as a motorcycle or an airplane.

Second Embodiment

A radar apparatus according to a second embodiment is described next. According to the present embodiment, the radar apparatus has a configuration the same as that of the first embodiment. For example, the radar apparatus transmits pulses of electromagnetic waves or light and measures a distance on the basis of a time when the pulses reflected by an object is returned to the radar apparatus.

Such a radar apparatus cannot compute the above-described radar-apparatus-direction relative velocity Vmod. However, the radar apparatus can compute the distance L. In this case, for example, a predetermined short time interval Δt is set. By using a distance L11 at a beginning time point of the short time interval Δt and a distance L12 at an end time point of the short time interval Δt, the radar-apparatus-direction relative velocity Vmod1 can be computed using the following equation (13):

$$Vmod1 = (L11 - L12)/\Delta t \quad (13)$$

In such a manner, by computing the radar-apparatus-direction relative velocity Vmod1 and the radar-apparatus-direction relative velocity Vmod2 at different points of time, the distance r of closest approach can be computed, as in the first embodiment. Thus, even a radar apparatus that cannot detect the relative velocity or that has a large error of a detected relative velocity can easily compute the distance of closest approach at high speed.

Third Embodiment

A radar apparatus according to a third embodiment is described next. According to the present embodiment, the radar apparatus has a configuration in which the reception antenna 5 can perform a scanning operation in a predetermined direction of the detection area. The other configurations are similar to those of the radar apparatus of the first embodiment.

The reception antenna 5 includes a plurality of antennas along an azimuth direction (a horizontal direction in this case). The reception antenna 5 further includes a switch for sequentially switching the antennas. Alternatively, the reception antenna 5 includes a mechanism for scanning one antenna in the azimuth direction.

In such a configuration, detection signals sequentially input to the signal processing circuit 1 are time-series signals obtained from different azimuth directions. The signal processing circuit 1 sequentially acquires a detection signal for one scan cycle and stores the acquired detection signal together with information about the azimuth direction. The signal processing circuit 1 then compares the signal intensities of the detection signals. At that time, since the detection signal corresponding to the azimuth direction towards the detection object is the strongest, the signal processing circuit 1 detects the detection signal having the highest signal intensity so as to detect the azimuth direction corresponding to the detection signal.

At the same time, the signal processing circuit 1 computes the azimuth angle using the method described in the first embodiment, the distance r of closest approach computed at predetermined intervals, and the detected distance L. The computed azimuth angle is not affected by deviation between the optical axis of the radar apparatus and the front direction of the reception antenna. The computed azimuth angle is a value when a direction of the optical axis is equal to a front reference direction. In contrast, the azimuth angle detected from the above-described signal intensity includes deviation between the optical axis and the front direction.

Using this characteristic, the signal processing circuit 1 compares, at predetermined intervals, the azimuth angle based on the distance of closest approach with the azimuth angle based on the signal intensity so as to compute a difference angle between these azimuth angles. Thus, the signal processing circuit 1 computes a difference angle between the azimuth angles. Subsequently, the signal processing circuit 1 considers the difference angle as a correction value and subtracts the difference angle from the azimuth angle computed from the signal intensity. By using such a method, the azimuth angle computed from the signal intensity can be corrected. An existing method using optical axis correction can be used only when a motor vehicle is stopped. However, this processing can be applied even when a motor vehicle is moving. Accordingly, even when a motor vehicle is moving, the azimuth angle computed from the signal intensity can be corrected as needed. Therefore, a correct azimuth angle can be acquired as needed.

Note that, in this method, some variations in the computed values of the azimuth angle based on the distance of closest approach are present. Accordingly, the signal processing circuit 1 may compute a correction value using the following method. That is, the signal processing circuit 1 acquires a plurality of correction values obtained from the azimuth angles using the two methods (the method based on the signal intensity and the method based on the distance of closest approach) and stores these correction values. At that time, the plurality of correction values may be correction values obtained from a plurality of detection objects observed at the same time or correction values obtained by observing one detection object over time. Furthermore, the plurality of correction values may be correction values obtained by observing a plurality of detection objects over time.

When storing the acquired correction values, the signal processing circuit 1 associates each of the correction values with the distance L detected for a detection object. Thereafter, the signal processing circuit 1 weights the plurality of correction values using, for example, the inverse of the detected distance L and computes an average value of these values. That is, the signal processing circuit 1 performs weighting on the basis of the inverse proportion of the distance from the radar apparatus 100. Note that the weighting method is not limited to a weighting method for simply assigning a weight inversely proportional to the detection distance. For example, any weighting method for assigning a higher weight to a distance closer to the radar apparatus 100 can be employed. The signal processing circuit 1 outputs the computed average value as a correction value for the deviation of the optical axis.

By performing such processing, an affect of variations in the azimuth angles obtained through each of the methods on the correction values can be reduced, and therefore, more accurate correction values for the azimuth angles can be computed.

Fourth Embodiment

The configuration of a mobile object according to a fourth embodiment is described next with reference to FIG. 4.

Figure 4:
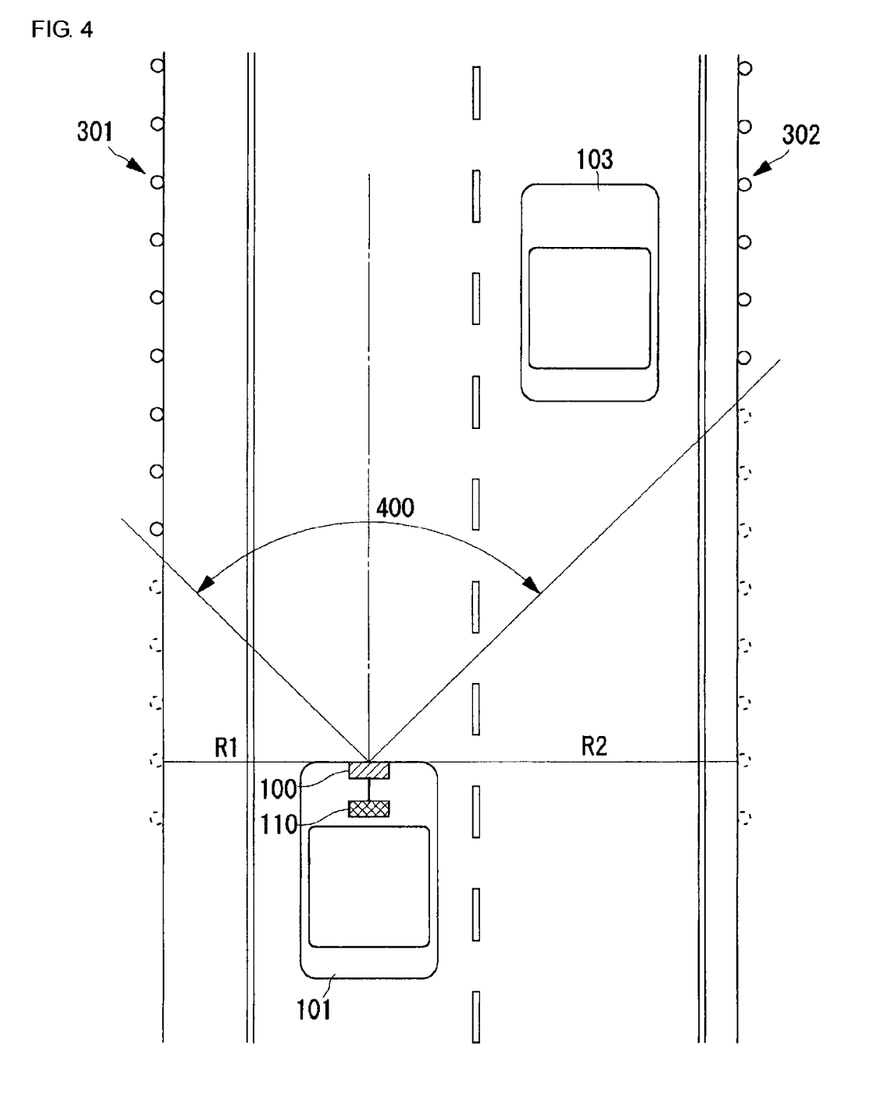
FIG. 4 illustrates the manner in which lane keeping of a mobile object is achieved according to a fourth embodiment.

FIG. 4 illustrates the manner in which lane keeping of the mobile object is achieved according to the fourth embodiment. In the drawing, the mobile object is traveling on an expressway with a median strip.

A vehicle 101 includes a radar apparatus 100 and a drive control unit 110 similar to those described in the foregoing embodiments. The radar apparatus 100 includes a scanning function similar to that of the third embodiment. In order to detect an object, the radar apparatus 100 horizontally scans a radar-apparatus detection area 400 as shown in FIG. 4.

The radar apparatus 100 scans a reception beam inside the radar-apparatus detection area 400 so as to detect an object. In an example shown in FIG. 4, through this operation, a different vehicle 103, a stationary side-strip object group 301, and a stationary median-strip object group 302 are detected. Thus, the distances, the relative velocities, and the azimuth angles thereof can be acquired. In addition, the radar apparatus 100 acquires the traveling velocity of the vehicle 101 from, for example, the drive control unit 110.

The radar apparatus 100 compares the traveling velocity of the vehicle 101 with each of the moving velocities of the different vehicle 103, the stationary side-strip object group 301, and the stationary median-strip object group 302 over a predetermined period of time. If the radar apparatus 100 detects that the absolute value of the moving velocity of the stationary side-strip object group 301 is substantially the same as that of the stationary median-strip object group 302 and the moving directions thereof are opposite to the moving direction of the vehicle 101, the radar apparatus 100 determines that the stationary side-strip object group 301 and the stationary median-strip object group 302 are stationary objects. In addition, since the radar apparatus 100 includes a scanning mechanism, the radar apparatus 100 detects that the stationary side-strip object group 301 is located on the left side of the vehicle 101 in the traveling direction and the stationary median-strip object group 302 is located on the right side of the vehicle 101 in the traveling direction. Furthermore, the radar apparatus 100 computes a distance R1 of closest approach of the stationary side-strip object group 301 and a distance R2 of closest approach of the stationary median-strip object group 302 using the above-described method. Subsequently, the radar apparatus 100 outputs the relative velocities, the distances, the azimuth angles, the distances of closest approach of the detected objects, and information as to whether each of the objects is a moving object or a stationary object as needed.

The drive control unit 110 performs drive control on the basis of the information obtained from the radar apparatus 100 so that the distances R1 and R2 of closest approach of the stationary side-strip object group 301 and the stationary median-strip object group 302, which are determined to be stationary objects, are constant over a predetermined period of time. In this way, the vehicle 101 can travel while maintaining the distances to the stationary side-strip object group 301 and the stationary median-strip object group 302 constant. That is, lane-keeping traveling control of the vehicle 101 can be achieved.

Note that, in such lane-keeping traveling control, it is not necessary to refer to the stationary side-strip object group 301 and the stationary median-strip object group 302 at the same time. Instead, only the stationary median-strip object group 302 may be referred. More specifically, in countries in which, as in Japan, motor vehicles travel in the left lane, the drive control unit 110 can refer to a stationary object detected on the right side. In contrast, in countries in which motor vehicles travel in the right lane, the drive control unit 110 can refer to a stationary object detected on the left side. This is because, since a branch, such as an entrance of an interchange, is normally located on the side-strip side and the bypass lane for, for example, a bus stop is also located on the side-strip side, the stationary side-strip object group 301 is not always disposed parallel to the traveling lane of the vehicle 101. In this way, more accurate lane-keeping traveling control can be performed.

As noted above, by using the configuration according to the present embodiment, accurate lane-keeping traveling control can be performed without using white line detection with a camera. That is, accurate lane-keeping traveling control can be performed using a simple configuration.

The foregoing embodiment has been described with reference to the case where a detection object, such as an oncoming vehicle, is located parallel to the traveling direction of the vehicle and is approaching to the vehicle at a constant velocity. However, even when a detection object, such as an oncoming vehicle, is not located parallel to the vehicle, the above-described configuration can be applied if the object is approaching to the vehicle at a constant velocity.

Fifth Embodiment

The configuration of a mobile object according to a fifth embodiment is described next with reference to FIG. 7.

In the first to fourth embodiments, it is assumed that a detection object is an oncoming vehicle, and the vehicle and the oncoming vehicle are located in the same plane. However, in the fifth embodiment, the detection object, such as a traffic sign, is located at a position higher than that of the vehicle. In the fifth embodiment, an example process for computing a height h and an azimuth angle θ is described.

Figure 7:
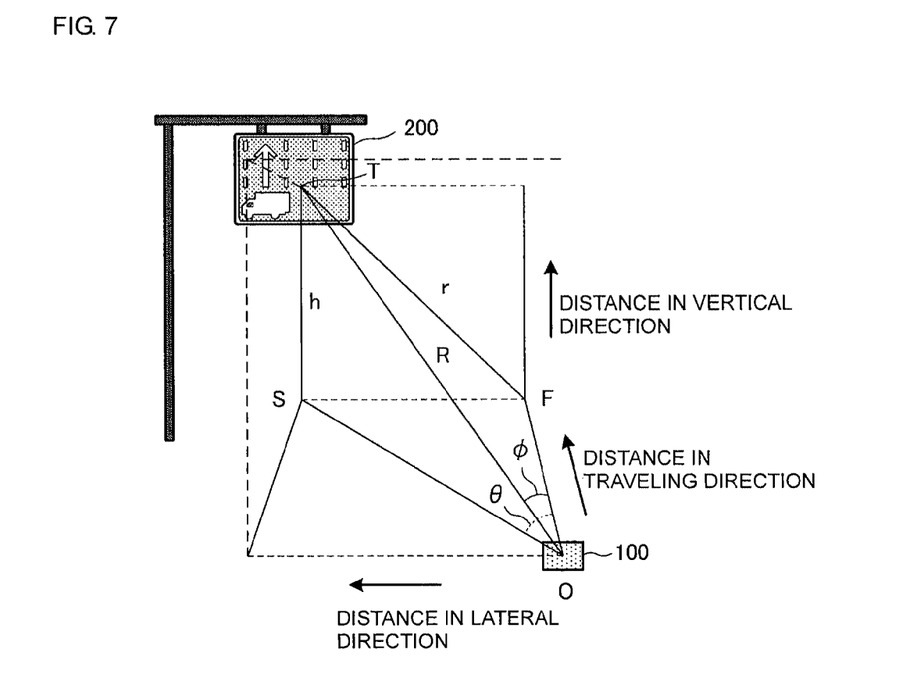
FIG. 7 is a diagram illustrating a mobile object according to a fifth embodiment and also illustrating a three-dimensional position of an object.

FIG. 7 illustrates a positional relationship between the radar apparatus 100 mounted in a vehicle and an object (a traffic sign) 200 located in front of the vehicle in a diagonal up left direction. Let O be the position of the radar apparatus 100, and let T be the middle position of the object 200. Then, the positional relationship between O and T is the same as that shown in FIG. 6. The height h of the object 200 can be computed by applying the azimuth angle θ, the distance R, the distance r of closest approach obtained using the means employed in the third embodiment to equation (11). Similarly, a distance in a lateral direction (the length of a line between F and S) when the vehicle including the radar apparatus 100 is at its nearest point to the object 200 is computed using equation (10) as needed. In addition, the distance in the traveling direction (the length of a line between O and F) is obtained using equation (8). Note that the azimuth angle θ may be computed using other means.

Also, note that equation (11) used for obtaining the height h of the object is established regardless of whether the object is higher or lower than the radar apparatus. For example, a fallen object on the road can be detected as the "height" from the radar apparatus. However, since an object is not present under the surface of the road, an object detected to be higher than the installation height of the radar apparatus from the road surface is considered to be an object located at a position higher than the radar apparatus. In particular, a radar apparatus for a vehicle is generally disposed at a position lower than the middle of the height of the vehicle, such as near a bumper or in front of the front grill. Accordingly, due to the reasons described above, an object located at a position higher than the vehicle height can be detected.

These values are output to a host apparatus. The host apparatus three-dimensionally displays the positional relationship between the vehicle and the object (traffic sign) 200 on a display unit on the basis of these values.

Sixth Embodiment

A sixth embodiment represents an exemplary process of the host apparatus.

A radar apparatus according to a sixth embodiment computes the height of an object simply by scanning a beam in the azimuth direction using the method described in the fifth embodiment. The radar apparatus extracts a stationary object from among all the detected objects on the basis of the traveling velocity of a vehicle including the radar apparatus 100 and the relative velocities of the objects. The radar apparatus then computes the distances (the heights) of the stationary object in the vertical direction. The height of a moving object is not computed. Alternatively, even when the radar apparatus computes the height of a moving object, the radar apparatus does not output the height information.

In contrast, for the stationary object, the radar apparatus determines whether the height of the object interferes with the traveling of the vehicle. If the computed distance in the lateral direction (the length of a line between F and S shown in FIG. 7) is smaller than a pre-defined value and the height h is smaller than a pre-defined value, the object 200 is considered as an obstacle. Thus, control is performed so that a warning message is output or the brake is applied.

In this way, even when a traffic sign, a traffic light, a crossover or the like is present in front of the vehicle in the traveling direction, this object is not considered as an obstacle.

When it is required to determine whether the vehicle can pass through under the object, the object can be considered as a stationary object. Accordingly, it is sufficient to compute the height of only the stationary object. As described above, by limiting objects for which the three-dimensional relative positions are computed to the stationary objects, the computing load can be reduced. In addition, even when the heights of objects other than the stationary objects are computed, the information is not sent to the host apparatus. Therefore, the load of a bus used for exchanging data between the host apparatus and a superior apparatus can be reduced.

The invention claimed is:

1. A radar apparatus comprising:
   a transmitting and receiving unit that transmits a transmission signal, receives a reflection signal of the transmission signal, and outputs a detection signal; and
   an object detecting unit that detects a distance of an object from the radar apparatus and a relative velocity of the object based on the detection signal;
   wherein the object detecting unit computes a distance of closest approach r of the object at two timing points based on a change in the distance of the object from the radar apparatus and a change in a component of the relative velocity of the object in a radar-apparatus direction acquired from the detection signal, and
   wherein the distance of closest approach r of the object is calculated as follows:

$$r = L1 \cdot L2 \cdot \sqrt{\frac{(V\mathrm{mod}1^2 - V\mathrm{mod}2^2)}{V\mathrm{mod}1^2 \cdot L1^2 - V\mathrm{mod}2^2 \cdot L2^2}}$$

wherein L1 denotes a distance detected at a first timing point of the two timing points, Vmod1 denotes a component of the relative velocity in the radar-apparatus direction at the first timing point, L2 denotes a distance detected at a second timing point of the two timing points, and Vmod2 denotes a component of the relative velocity in the radar-apparatus direction at the second timing point.

2. The radar apparatus according to claim 1, wherein the transmitting and receiving unit generates a beat signal obtained from the transmission signal and the reflection signal and outputs the beat signal as the detection signal, and the object detecting unit computes the distance and the relative velocity of the object using a frequency of the beat signal.

3. The radar apparatus according to claim 1, wherein the object detecting unit computes the relative velocity based on time variations in a plurality of detected distances of the object.

4. The radar apparatus according to claim 1, further comprising:
   a collision determination unit that determines whether a risk of collision with the object exists based on the distance of closest approach.

5. A radar apparatus comprising:
   a transmitting and receiving unit that transmits a transmission signal, receives a reflection signal of the transmission signal, and outputs a detection signal;
   an object detecting unit that detects a distance of an object from the radar apparatus and a relative velocity of the object based on the detection signal, wherein the object detecting unit computes a distance of closest approach of the object based on a change in the distance of the object from the radar apparatus and a change in the relative velocity of the object acquired from the detection signal; and
   an object angle detecting unit that, when a moving velocity of a mobile object including the radar apparatus is higher than or equal to a predetermined threshold value, computes an object angle ($\phi$) formed between the object and a direction in which the mobile object moves based on the distance (R) of the object from the radar apparatus and the distance (r) of closest approach of the object.

6. The radar apparatus according to claim 5, further comprising:
   a collision determination unit that determines whether a risk of collision with the object exists based on the distance of closest approach.

7. The radar apparatus according to claim 6, further comprising:
   an azimuth angle detecting unit that detects an azimuth angle ($\theta$) of the object; and
   an optical axis correcting unit that corrects a deviation of an optical axis with respect to the azimuth angle ($\theta$) detected by the azimuth angle detecting unit based on the azimuth angle ($\theta$) and the object angle ($\phi$) when the object and the mobile object are determined as being located in a same horizontal plane.

8. The radar apparatus according to claim 7, further comprising:
   a collision determination unit that determines whether a risk of collision with the object exists based on the distance of closest approach.

9. A radar apparatus comprising:
   a transmitting and receiving unit that transmits a transmission signal, receives a reflection signal of the transmission signal, and outputs a detection signal;
   an object detecting unit that detects a distance of an object from the radar apparatus and a relative velocity of the object based on the detection signal, wherein the object detecting unit computes a distance of closest approach of the object based on a change in the distance of the object from the radar apparatus and a change in the relative velocity of the object acquired from the detection signal;

an azimuth angle computing unit that computes an azimuth angle ($\theta$) of the object; and an object height computing unit that computes a height (h) of the object based on the azimuth angle ($\theta$) computed by the azimuth angle computing unit, an object angle ($\phi$) formed between the object and the radar apparatus, the distance of the object from the radar apparatus, and the distance of closest approach.

10. The radar apparatus according to claim 9, further comprising:
a collision determination unit that determines whether a risk of collision with the object exists based on the distance of closest approach.

11. A mobile object comprising:
the radar apparatus according to claim 10; and
a collision avoiding unit that performs a collision avoiding operation based on information obtained by the collision determination unit.

* * * * *